G. R. HENDERSON.
RACK TENDER FOR LOCOMOTIVES.
APPLICATION FILED SEPT. 11, 1912.

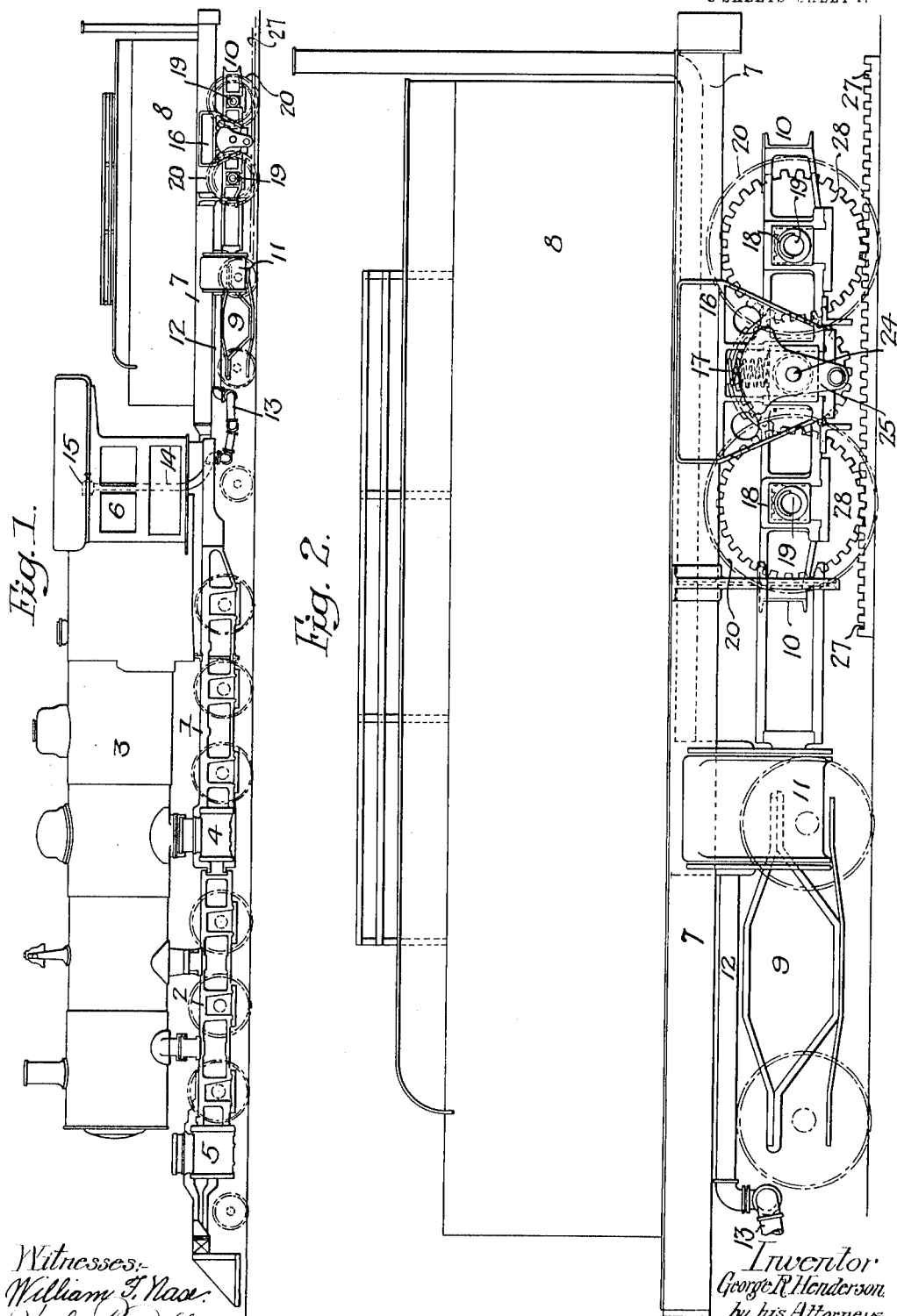

1,063,879.

Patented June 3, 1913.

2 SHEETS—SHEET 2.

Witnesses:
William F. Nase
Walker P. Pullinger

Inventor
George R. Henderson,
by his Attorneys,
Howson & Howson

UNITED STATES PATENT OFFICE.

GEORGE R. HENDERSON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

RACK-TENDER FOR LOCOMOTIVES.

1,063,879. Specification of Letters Patent. Patented June 3, 1913.

Application filed September 11, 1912. Serial No. 719,808.

*To all whom it may concern:*

Be it known that I, GEORGE R. HENDERSON, a citizen of the United States, residing in Philadelphia, Pennsylvania, have invented certain Improvements in Rack-Tenders for Locomotives, of which the following is a specification.

The object of this invention is to provide the tender of a locomotive with gear mechanism, which may mesh with the rack of a roadbed where the grade is such that it is impractical to use an adhesion locomotive.

By placing the gearing and the driving mechanism therefor on the tender, the tender can be coupled to any adhesion locomotive. It has been the usual practice to make a combined adhesion and rack locomotive, but this has greatly complicated the parts of the locomotive. By my invention the rack mechanism is placed entirely on the tender so that any type of adhesion locomotive can be employed in connection with it.

Figure 3:
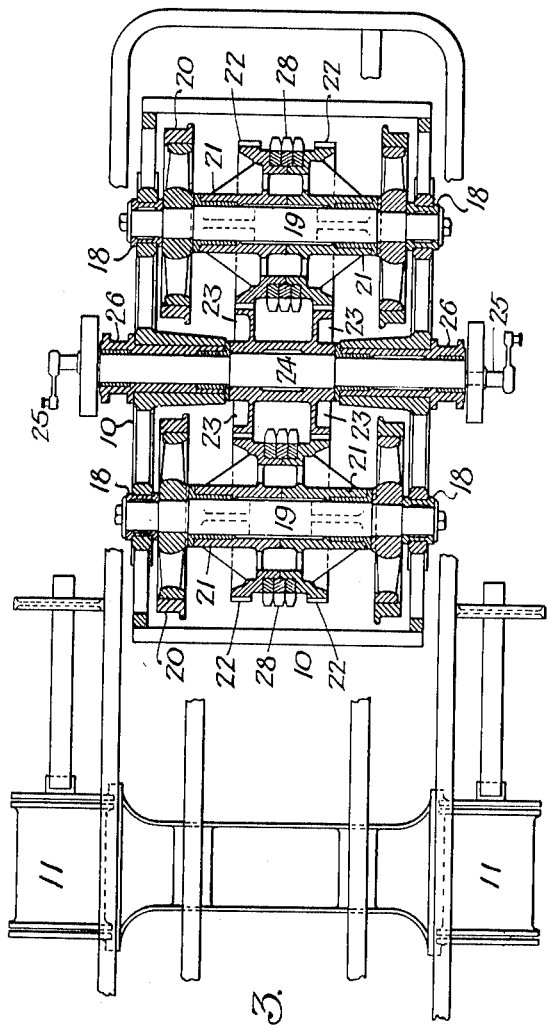
Figure 4:
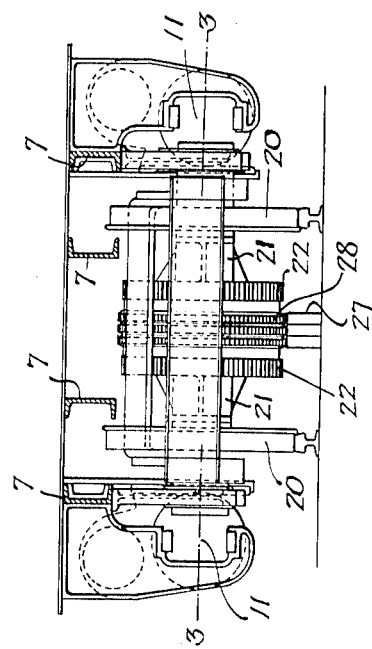

In the accompanying drawings:—Figure 1, is a view, in diagram, illustrating a locomotive with my improved rack tender; Fig. 2, is an enlarged side view of the tender; Fig. 3, is a sectional plan view of a portion of the tender, showing the driving mechanism, on the line 3—3, Fig. 4; and Fig. 4, is a transverse sectional view of the tender.

Referring to Fig. 1, I have shown an ordinary "Mallet" compound locomotive in connection with my special tender, which has gear wheels to suit the rack of the roadbed. 1 is the rear frame and 2 is the forward frame of the "Mallet" locomotive.

3 is a boiler.

4 illustrates the high pressure cylinder and 5 the low pressure cylinder. The steam admitted to these cylinders drives the wheels on each of the frames in the ordinary manner.

6 is the cab of the locomotive in which is the operating mechanism under the control of the engineer.

7 is the frame of the tender.

8 is the tank.

9 is the ordinary type of swiveled truck located, in the present instance, on the forward end of the tender, and 10 is the special truck carrying the rack mechanism.

11, 11 are the steam cylinders, one on each side of the tender frame and steam is supplied to the cylinders through the pipe 12 and flexible steam coupling 13 by the supply pipe 14 leading from the boiler. Steam from the boiler is controlled by a throttle valve 15 in position to be manipulated by the engineer.

16, 16 are pedestals, one at each side of the tender frame, and mounted between the frame of the truck 10 and the pedestals 16 are springs 17, which yieldingly support the tender.

18, 18 are the boxes located in the frame of the truck 10 and mounted in these boxes are the axles 19 on which are the traction wheels 20, which travel freely on the rails of the track. Loosely mounted on each axle is a hollow shaft 21, on which are two gear wheels 22, in the present instance, which mesh with wheels 23 secured to a shaft 24 extending transversely from one side of the truck to the other. On each end of the shaft is a crank 25. The shaft is adapted to extended bearings 26 in the frame of the truck, as clearly shown in Fig. 3, and the cranks are connected to piston rods having pistons adapted to the cylinders 11, so that the hollow shafts 21 are positively driven by the steam entering the cylinders of the tender, and this driving mechanism has no connection with the driving mechanism of the locomotive.

Mounted on each hollow shaft 21 are three gear rings 28, each set being adapted to an annular groove in the shaft between the two gear wheels 22. These gear rings mesh with the rack 27, Fig. 4, located in the track midway between the rails, in the present instance.

By the above construction, it will be seen that the rack driving mechanism can be controlled independently of the traction motive power of the locomotive and, consequently, when the locomotive is traveling on a level track or on one with a slight grade the rack mechanism is thrown out of gear by merely closing the throttle valve 15 in the cab of the locomotive, but when the train reaches a steep grade and there is a rack in the roadbed, then the rack mechanism on the tender is thrown into action by simply opening the throttle valve 15 and allowing steam to enter the cylinders 11 on the tender; the rack mechanism and the traction mechanism being operated in unison.

In descending grades brake action may be obtained by closing the throttle and reversing the valve motion of the engine on the tender and allow the compressed air to escape through a safety valve, similarly to methods which have been long in use on heavy grade work.

By constructing the truck frame 10 in the manner illustrated, it permits a spring action, yet prevents any swiveling of the truck in rounding curves; thus keeping the crank shaft always in proper relation to the cylinders 11. The other truck, however, is a swing truck and can accommodate itself to curves.

I claim:—

1. The combination in a locomotive and tender, of traction driving mechanism on the locomotive; and independent rack mechanism on the tender.

2. The combination in the tender of a locomotive, of the tender frame; a truck thereunder; cylinders carried by the tender frame; gearing driven by steam admitted to the cylinders; said gearing being arranged to mesh with a rack of a track; with a pipe leading from the cylinders to the boiler of the locomotive; and means for controlling the steam from the boiler.

3. The combination in a locomotive tender, of a frame; a swing truck at one end of the frame; a truck yieldingly supporting the tender at the opposite end thereof; but held against swiveling action; cylinders on the tender frame; pistons in the cylinders connected to the crank shaft; with a gear wheel adapted to a rack on the track and driven by the crank shaft.

4. The combination in a tender of a locomotive, of a tender frame; a truck located under the frame; two axles mounted in the truck; traction wheels on said axles; a hollow shaft mounted on each axle; a gear wheel on each hollow shaft; a crank shaft having a gear wheel meshing with the gear wheel on the hollow shaft; and driving mechanism connected to the said cranks of the crank shaft.

5. The combination in a tender, of a frame; a truck mounted under said frame; pedestals on the tender frame and adapted to hold the truck against swiveling motion; springs mounted between the truck and the tender frame at the pedestals; two axles mounted in the truck frame; traction wheels on the axles; two hollow shafts, one mounted on each axle and arranged to turn independently thereof; a pair of gear wheels on each hollow shaft; gear rings located on the hollow shaft between the gear wheels and arranged to mesh with the rack located on the track; with a crank shaft mounted in bearings on the truck frame and having two gear wheels meshing with the wheels on the hollow shafts; a crank at each end of said crank shaft; a cylinder mounted at each side of the tender frame and having a piston connected to the cranks; a steam pipe leading from the boiler of the locomotive and connected to the cylinders; and a valve controlling the flow of steam through the said pipe.

In testimony whereof, I have signed my name to this specification, in the presence of two subscribing witnesses.

GEORGE R. HENDERSON.

Witnesses:
Jas. H. M. Hayes,
Louis N. Bender.